United States Patent
Zhang

(10) Patent No.: US 10,328,892 B2
(45) Date of Patent: Jun. 25, 2019

(54) AIR BAG PACKAGING ARRANGEMENT AND SELF-ADHESIVE CHECKING VALVE THEREOF

(71) Applicant: Shanghai Air-Paq Composite Material Co . ltd., Shanghai (CN)

(72) Inventor: Jiaying Zhang, Shanghai (CN)

(73) Assignee: Shanghai Air-Paq Composite Material Co., Ltd., Shanghai (CN)

( * ) Notice: Subject to any disclaimer, the term of this patent is extended or adjusted under 35 U.S.C. 154(b) by 696 days.

(21) Appl. No.: 14/923,398

(22) Filed: Oct. 26, 2015

(65) Prior Publication Data

US 2016/0137156 A1      May 19, 2016

Related U.S. Application Data

(63) Continuation of application No. 13/887,298, filed on May 4, 2013, now Pat. No. 9,199,597, which is a continuation of application No. 13/887,297, filed on May 4, 2013, now Pat. No. 9,199,596.

(51) Int. Cl.
| | |
|---|---|
| *B29D 22/02* | (2006.01) |
| *B60R 21/26* | (2011.01) |
| *F16K 15/14* | (2006.01) |
| *B60R 21/16* | (2006.01) |
| *B65D 81/02* | (2006.01) |
| *B65D 81/05* | (2006.01) |
| *F16K 15/20* | (2006.01) |

(Continued)

(52) U.S. Cl.
CPC .............. *B60R 21/26* (2013.01); *B29D 22/02* (2013.01); *B60R 21/16* (2013.01); *B65B 31/00* (2013.01); *B65B 51/10* (2013.01); *B65D 81/022* (2013.01); *B65D 81/052* (2013.01); *F16K 15/147* (2013.01); *F16K 15/202* (2013.01); *B60R 2021/26094* (2013.01); *Y10T 137/36* (2015.04)

(58) Field of Classification Search
USPC .......................................................... 156/145
See application file for complete search history.

(56) References Cited

U.S. PATENT DOCUMENTS

| | | | |
|---|---|---|---|
| 9,623,622 B2 * | 4/2017 | Baines ................ | B65D 81/052 |
| 2008/0080792 A1 * | 4/2008 | Liao .................... | B65D 81/052 |
| | | | 383/3 |

FOREIGN PATENT DOCUMENTS

CN             200975536 Y  *  11/2007

* cited by examiner

*Primary Examiner* — Jeffry H Aftergut
(74) *Attorney, Agent, or Firm* — Raymond Y. Chang; David and Raymond Patent Firm

(57) ABSTRACT

An air bag packaging arrangement adapted to have a self-adhesive checking valve includes an air bag and an air valve which is the self-adhesive checking valve. The air bag includes first and second cell overlapped layers to form an air chamber and a valve opening. The air valve includes first and second sealing films overlapped between the first and second cell layers, and a check sealing film overlapped between proximal portions of the first and second sealing films to define an air inflating channel between the first sealing film and the check sealing film, and a backflow prevention channel between the check sealing film and the second sealing film. In case of air leakage, the air is guided to flow to the backflow prevention channel for creating a supplemental air pressure to further seal and close the air inflating channel, so as to make up a deficient sealing effect of the first and second sealing films.

10 Claims, 12 Drawing Sheets

(51) Int. Cl.
*B65B 31/00* (2006.01)
*B65B 51/10* (2006.01)

A-A

AIR BAG PACKAGING ARRANGEMENT AND SELF-ADHESIVE CHECKING VALVE THEREOF

CROSS REFERENCE OF RELATED APPLICATION

This is a Continuation application that claims the benefit of priority under 35U.S.C. § 119 to a non-provisional application, application Ser. No. 13/887,298, filed May 4, 2013, which is a Continuation application of a non-provisional application, application Ser. No. 13/887,297, filed May 4, 2013.

BACKGROUND OF THE PRESENT INVENTION

Field of Invention

The present invention relates to a packing product, and more particular to an air bag packaging arrangement and a self-adhesive checking valve therefor, wherein the air bag packaging arrangement comprises an air bag and an air valve for air-sealing the air bag after the air bag is inflated, and the self-adhesive checking valve has a backflow prevention channel adapted for self-adhesiving to prevent air leakage.

Description of Related Arts

Air cushioning product, such as "Bubble Wrap", is excellent for packaging because it provides a cushioning effect but also water resistant for an item to be packed. However, the "bubble wrap" is too thin to provide enough cushioning effect for a relatively larger item. An improved air cushioning product is provided as an air bag having an air valve, wherein the air bag is inflated via the air valve to enhance the air cushioning effect. The air valve, such as check valve, stop valve, and safety valve, has a predetermined structure for preventing air leakage of the air bag. However, the air seal configuration of the air valve is complicated and cannot enduringly retain the air within the air bag.

FIG. 6 illustrates an air bag with a conventional air valve, wherein the air bag comprises two bag layers 1, 2 overlapped with each other to define an opening. The air valve comprises two valve layers 3, 4 overlappedly affixed between the bag layers 1, 2 at the opening so as to form a four-layered configuration. Accordingly, when the air bag is inflated, the valve layers 3, 4 are bonded to seal at the opening of the air bag so as to seal the air within the air bag. In particular, the first valve layer 3 is overlappedly bonded to the first bag layer 1 while the second valve layer 4 is overlappedly bonded to the second bag layer 2. When inflating the air bag, air is guided to pass through a channel between the first and second valve layers 3, 4. Once the air bag is inflated completely, the valve layers 3, 4 are bonded together to close and seal the opening of the air bag. In addition, the air pressure within the air bag will exert at the valve layers 3, 4 to ensure the valve layers 3, 4 being bonded together so as to prevent air being leaked through the air valve. In addition, the air valve is a one-way air valve only allowing air entering into the air bag. However, since the valve layers 3, 4 are self-adhered together to provide the sealing effect, the air will be gradually leaked through the channel after a period of use, especially when the air bag is compressed continuously.

SUMMARY OF THE PRESENT INVENTION

The invention is advantageous in that it provides an air bag packaging arrangement, wherein the air valve is a double non-return valve to provide double sealing effects of the air bag after the air bag is inflated.

Another advantage of the invention is to provide an air bag packaging arrangement, wherein the air inflating channel is sealed and closed by the two sealing films as the first sealing effect and is further sealed and closed by the check sealing film as the second sealing effect, so as to prevent any air leakage of the air bag.

Another advantage of the invention is to provide an air bag packaging arrangement, wherein in case of air leakage, the air is guided to flow to a backflow prevention channel for creating a supplemental air pressure to further seal and close the air inflating channel, so as to make up a deficient sealing effect of the sealing films.

Another advantage of the invention is to provide an air bag packaging arrangement, wherein the air leaked from the air chamber of the air bag will be filled into the backflow prevention channel to further seal and close the air inflating channel. Therefore, when the air pressure at the air chamber is reduced, the air pressure at the backflow prevention channel will be increased. In other words, the air pressure within the air bag will remain the same to provide the same air cushioning effect even the air chamber is leaked. Accordingly, the more the air leaked from the air chamber, the better the sealing effect of the check sealing film forms.

Another advantage of the invention is to provide an air bag packaging arrangement, which is adapted for incorporating with any pumping device to input the compressed air into the air bag via the air valve.

Another advantage of the invention is to provide an air bag packaging arrangement, which does not require altering the original structure of the air bag so as to reduce the manufacturing cost of the air bag with built-in air valve.

Another advantage of the invention is to provide an air bag packaging arrangement, wherein no expensive or mechanical structure is required to employ in the present invention in order to achieve the above mentioned objects. Therefore, the present invention successfully provides an economic and efficient solution not only for providing a double air-sealing configuration of the air bag but also for enhancing the practice use of the air bag.

Another advantage of the invention is to provide a self-adhesive checking valve which is adapted to be used in an air bag packaging arrangement, wherein the self-adhesive checking valve allows fluid such as air to flow therethrough and provides a backflow prevention channel for self-adhesion of the valve so as to prevent leakage of the fluid, so that life span of the air bag packaging arrangement can be prolonged.

Additional advantages and features of the invention will become apparent from the description which follows, and may be realized by means of the instrumentalities and combinations particular point out in the appended claims.

According to the present invention, the foregoing and other objects and advantages are attained by an air bag packaging arrangement which comprises an air bag and an air valve.

The air bag comprises at least one inflatable air cell, wherein the air cell comprises a first cell layer and a second cell layer overlapped with each other to form an air chamber and a valve opening communicating with the air chamber.

The air valve, which is a double non-return valve, comprises a first sealing film, a second sealing film, and a check sealing film.

The first and second sealing films are overlapped between the first and second cell layers of the air cell and extended from the valve opening of the air cell into the air chamber thereof.

The check sealing film is overlapped between proximal portions of the first and second sealing films to define an air inflating channel between the first sealing film and the check sealing film, and a backflow prevention channel between the check sealing film and the second sealing film, wherein the air inflating channel is arranged for inputting air into the air chamber to inflate the air cell until distal portions of the first and second sealing films are overlapped and sealed to close the air inflating channel by means of air pressure within the air chamber, wherein in case of air leakage between the distal portions of the first and second sealing films, the air within the air chamber is guided to flow to the backflow prevention channel for creating a supplemental air pressure to further seal and close the air inflating channel, so as to make up a deficient sealing effect of the first and second sealing films.

In accordance with another aspect of the invention, the present invention comprises a method of manufacturing an air bag, which comprises the steps of:

(a) making an air cell to have a first cell layer and a second cell layer overlapped with each other to form an air chamber and a valve opening;

(b) placing an air valve between the first and second cell layers to form an air inflating channel for communicating the valve opening with the air chamber, and to form a backflow prevention channel to communicate with the air chamber, wherein an inflating direction of the air inflating channel is opposite to an inputting direction of the backflow prevention channel;

(c) inputting air into the air chamber through the air inflating channel to inflate the air cell so as to seal and close the air inflating channel by means of air pressure within the air chamber; and (d) in case of air leakage, guiding the air within the air chamber to flow to the backflow prevention channel for creating a supplemental air pressure to further seal and close the air inflating channel, so as to prevent the air being leaked from the valve opening.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
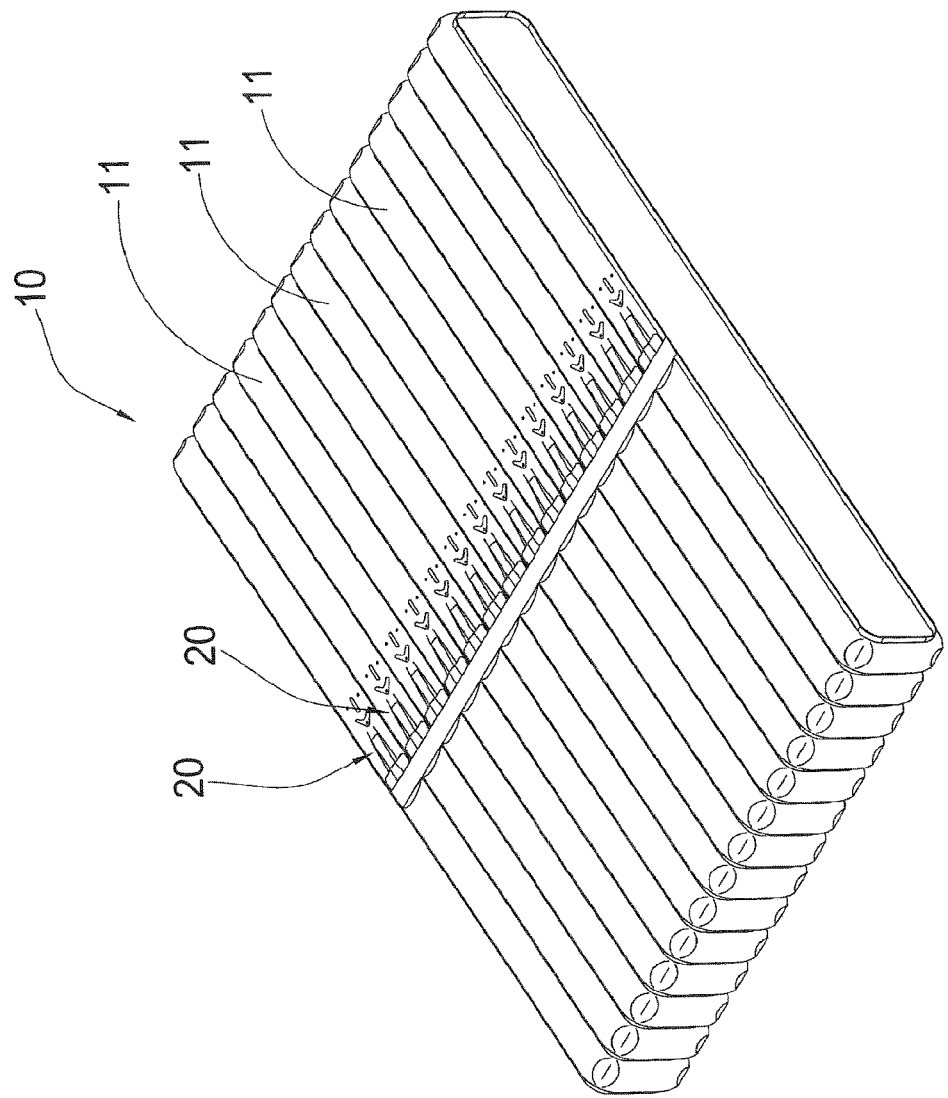
FIG. 1 is a perspective view of an air bag packaging arrangement according to a preferred embodiment of the present invention.
Figure 2:
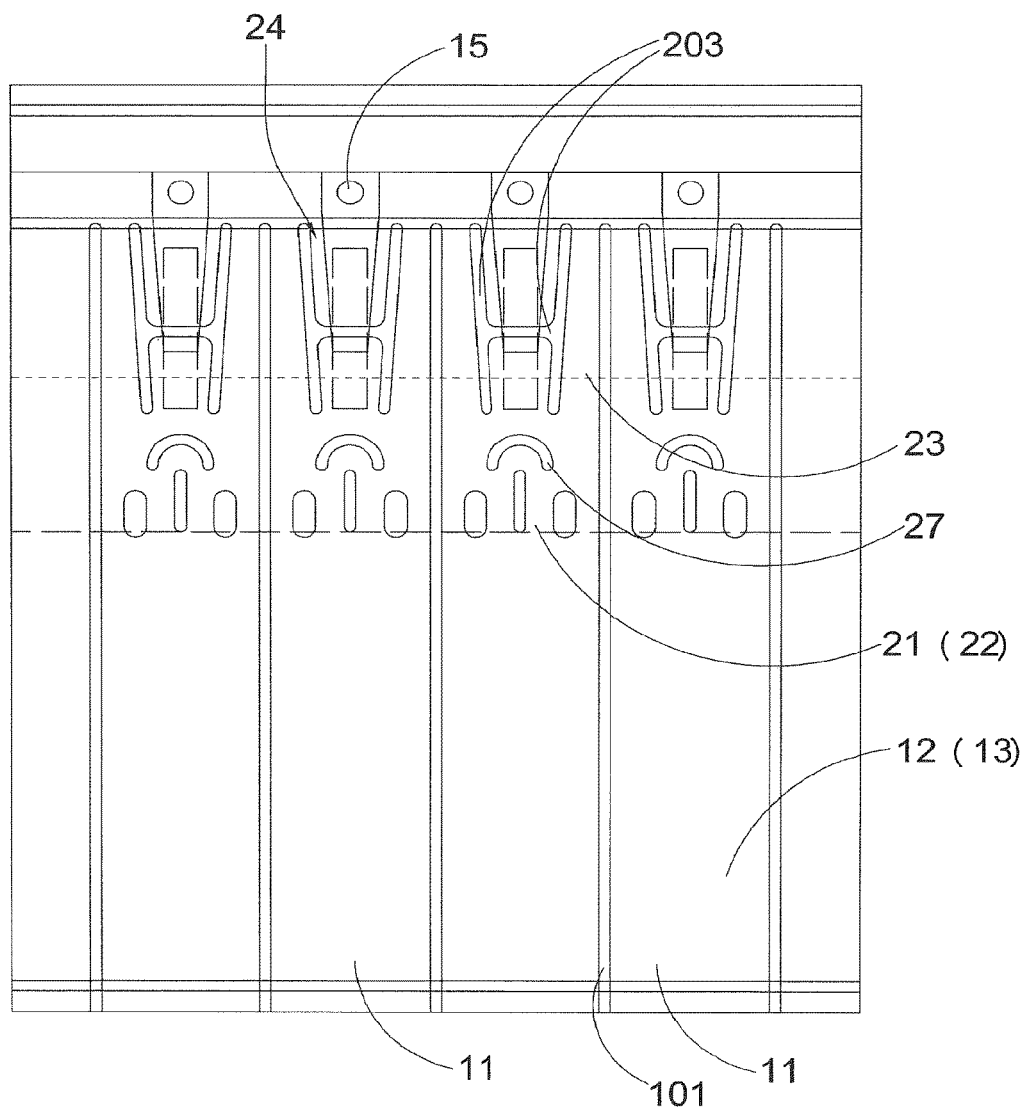
FIG. 2 is a top view of the air valve of the air bag packaging arrangement according to the preferred embodiment of the present invention, illustrating the air bag at a deflated state.

Referring to FIGS. 1 and 2, an air bag packaging arrangement according to a preferred embodiment of the present invention is illustrated, wherein the air bag packaging arrangement is arranged for disposing at a packing area to surround a storage item so as to provide a cushioning effect for the item. Accordingly, the air bag packaging arrangement comprises an air bag 10 and an air valve 20.

The air bag 10 comprises at least one inflatable air cell 11, wherein the air cell 11 comprises a first cell layer 12 and a second cell layer 13 overlapped with each other to form an air chamber 14 and a valve opening 15 communicating with the air chamber 14. As shown in FIGS. 1 and 2, two or more air cells 11 are constructed side-by-side to form the air bag 10, wherein the air valve 20 is provided at each of the air cells 11. In other words, each air cell 11 is an independent cell to be inflated. A sealing wall 101 is formed between two air cells 11. It is appreciated that the air cells 11 are intercommunicating with each other that only one air valve 20 is required to inflate all the air cells 11. In addition, the air bag 10 can be configured at any shape and size since the shape of each of the air cells 11 can be varied after inflation.

Figure 3:
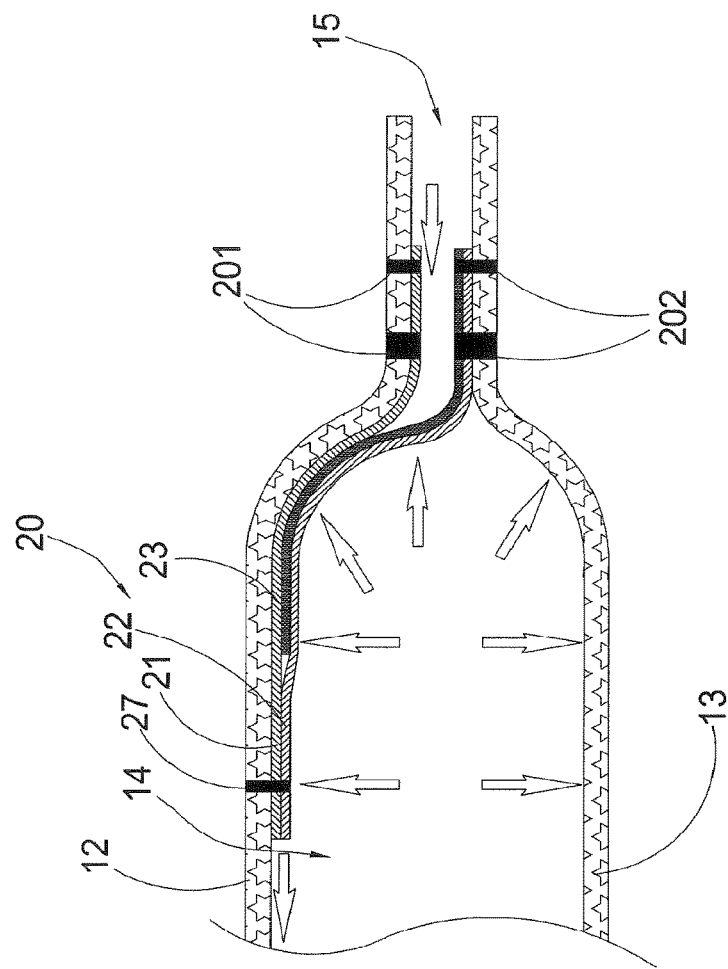
FIG. 3 is a sectional view of the air valve of the air bag packaging arrangement according to the preferred embodiment of the present invention, illustrating the air cell being inflated.

As shown in FIG. 3, the air valve 20 is a double non-return valve for providing double sealing effects for the air bag 10, wherein the air valve 20 comprises a first sealing film 21, a second sealing film 22, and a check sealing film 23.

The first and second sealing films 21, 22 are overlapped between the first and second cell layers 12, 13 of the air cell 11 and extended from the valve opening 15 of the air cell 11 into the air chamber 14 thereof. The first and second sealing films 21, 22 are two thin flexible sheets made of plastic being overlapped with each other, wherein the first and second sealing films 21, 22 are preferably two identical sheets.

Each of the first and second sealing films 21, 22 has a proximal edge extended from the valve opening 15 of the air cell 11 and a distal edge extended to the air chamber 14. Preferably, the proximal and distal edges of the first and second sealing films 21, 22 are coterminous.

As shown in FIG. 3, the proximal edge of the first sealing film 21 is bonded with the first cell layer 12. The proximal edge of the second sealing film 22 is bonded with the second cell layer 13.

The check sealing film 23 is overlapped between the proximal portions of the first and second sealing films 21, 22 to define an air inflating channel 24 between the first sealing film 21 and the check sealing film 23, and a backflow prevention channel 25 between the check sealing film 23 and the second sealing film 22.

Figure 4A:
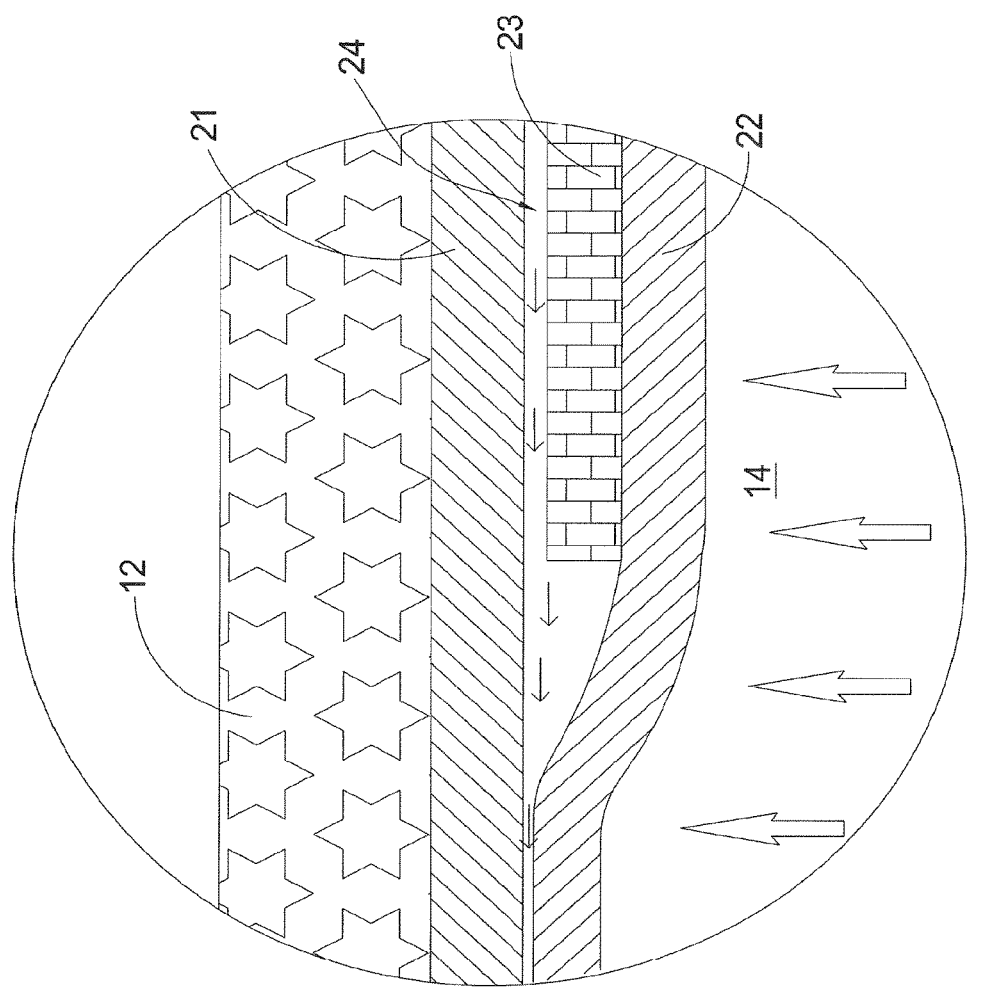
FIG. 4A is an enlarged sectional view of the air valve of the air bag packaging arrangement according to the preferred embodiment of the present invention, illustrating the air passing through the air inflating channel.
Figure 4B:
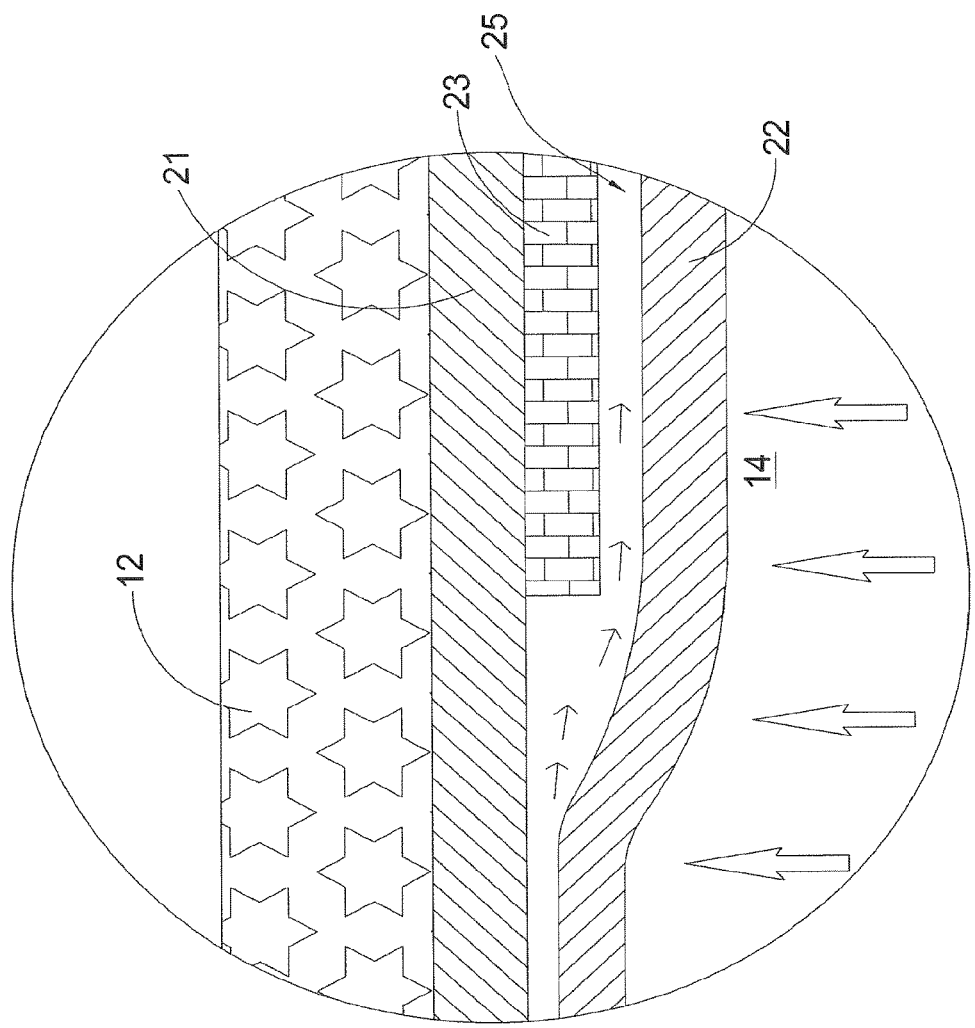
FIG. 4B is an enlarged sectional view of the air valve of the air bag packaging arrangement according to the preferred embodiment of the present invention, illustrating the air leaked into the backflow prevention channel.

As shown in FIG. 4A, the air inflating channel 24 is arranged for inputting air into the air chamber 14 to inflate the air cell 11 until distal portions of the first and second sealing films 21, 22 are overlapped and sealed to close the air inflating channel 24 by means of air pressure within the air chamber 14. According to the preferred embodiment, in case of air leakage between the distal portions of the first and second sealing films 21, 22, as shown in FIG. 4B, the air within the air chamber 14 is guided to flow to the backflow prevention channel 25 for creating a supplemental air pressure to further seal and close the air inflating channel 24, so as to make up a deficient sealing effect of the first and second sealing films 21, 22.

As shown in FIG. 3, the air inflating channel 24 has two opened ends that one proximal opened end of the air inflating channel 24 is formed at the proximal edges of the first sealing film 21 and the check sealing film 23 to communicate with the valve opening 15 while another opposed distal opened end of the air inflating channel 24 is extended toward the distal edges of the first and second sealing films 21, 22 to communicate with the air chamber 14. The compressed air can be inputted at the valve opening 15 to the air chamber 14 through the air inflating channel 24.

It is worth mentioning that when the air cell 11 is inflated, the air pressure is retained within the air chamber 14 to apply the pressing force against the first and second sealing films 21, 22 therewithin, so as to seal the distal portions of the first and second sealing films 21, 22 and to close the distal opened end of the air inflating channel 24. In addition, the distal portions of the first and second sealing films 21, 22 are sealed together by the surface tensions thereof.

The check sealing film 23 is a thin flexible sheet made of plastic. Preferably, the first and second sealing films 21, 22, and the check sealing film 23 are polyethylene (PE) films. In addition, the thickness of each of the first and second cell layers 12, 13 is larger than the thickness of each of the first and second sealing films 21, 22, and the check sealing film 23.

According to the preferred embodiment, the length of the check sealing film 23 is shorter than the length of each of the first and second sealing films 21, 22, such that when the check sealing film 23 is overlapped between the proximal portions of the first and second sealing films, 21, 22, the distal portions of the first and second sealing films 21, 22 are overlapped with each other. It is worth mentioning that the length of the check sealing film 23 is the distance between the proximal and distal edges thereof. The length of each of the first and second sealing films 21, 22 is the distance between the proximal and distal edges thereof.

Accordingly, the proximal edges of the first and second sealing films 21, 22 and the check sealing film 23 are coterminous at the valve opening 15. In addition, the proximal edge of the check sealing film 23 is bonded with the proximal edge of the second sealing film 22.

As shown in FIG. 3, the backflow prevention channel 25 is formed between the check sealing film 23 and the second sealing film 22, wherein the backflow prevention channel 25 has an opened end facing toward the air chamber 14 and a closed end facing toward the valve opening 15. In other words, the proximal end of the backflow prevention channel 25 is the closed end while the distal end of the backflow prevention channel 25 is the opened end.

Accordingly, when the air is filled at the backflow prevention channel 25 at the open end thereof, the backflow prevention channel 25 is inflated for creating the supplemental air pressure to seal and close the air inflating channel 24 between the first sealing film 21 and the check sealing film 23.

It is worth mentioning that when the air is input into the air chamber 15 through the air inflating channel 24, the airflow direction of the air inflating channel 24 is opposite to the airflow direction of the backflow prevention channel 25, as shown in FIGS. 4A and 4B. Therefore, no air will be input to the backflow prevention channel 25. When the air is leaked from the air chamber 15 back to the air inflating channel 24, the air will fill into the backflow prevention channel 25 and to create the supplemental air pressure to seal and close the air inflating channel 24, so as to prevent the air being leaked from the valve opening 15. It is worth mentioning the leaked air will flow from the distal opened end of the air inflating channel 24 to the distal opened end of the backflow prevention channel 25 before exiting the proximal opened end of the air inflating channel 24, so as to prevent the air being leaked to the valve opening 15. In addition, the check sealing film 23 is sealed with the first sealing film 21 by the surface tensions thereof to seal and close the air inflating channel 24.

In order to form the air valve 20 at the air cell 11, the air valve 20 further comprises a first sealing seam 201 bonding the first cell layer 12 with the first sealing film 21 at the valve opening 15 of the air cell 11, and a second sealing seam 202 bonding among the second cell layer 13, the check sealing film 23, and the second sealing film 22 together at the valve opening 15 of the air cell 11.

Accordingly, the proximal edge of the first sealing film 21 is bonded with the first cell layer 12 via the first sealing seam 201. The second cell layer 13 is bonded with the proximal edge of the second sealing film 22 and the proximal edge of the check sealing film 23 via the second sealing seam 202. Preferably, two spaced apart first sealing seams 201 are formed to bond the first cell layer 12 with the first sealing film 21 while two spaced apart second sealing seams 202 are formed to among the second cell layer 13, the check sealing film 23, and the second sealing film 22 together. It is worth mentioning the first and second sealing seams 201, 202 are heat sealed seams, such as heat sealed lines and crescent-shaped heat sealed blocks. In other words, the proximal edge of the first sealing film 21 is heat-sealed with the first cell layer 12 via the first sealing seam 201 by heat sealing. The second cell layer 13 is heat-sealed with the proximal edge of the second sealing film 22 and the proximal edge of the check sealing film 23 via the second sealing seam 202 by heat sealing.

Figure 5:
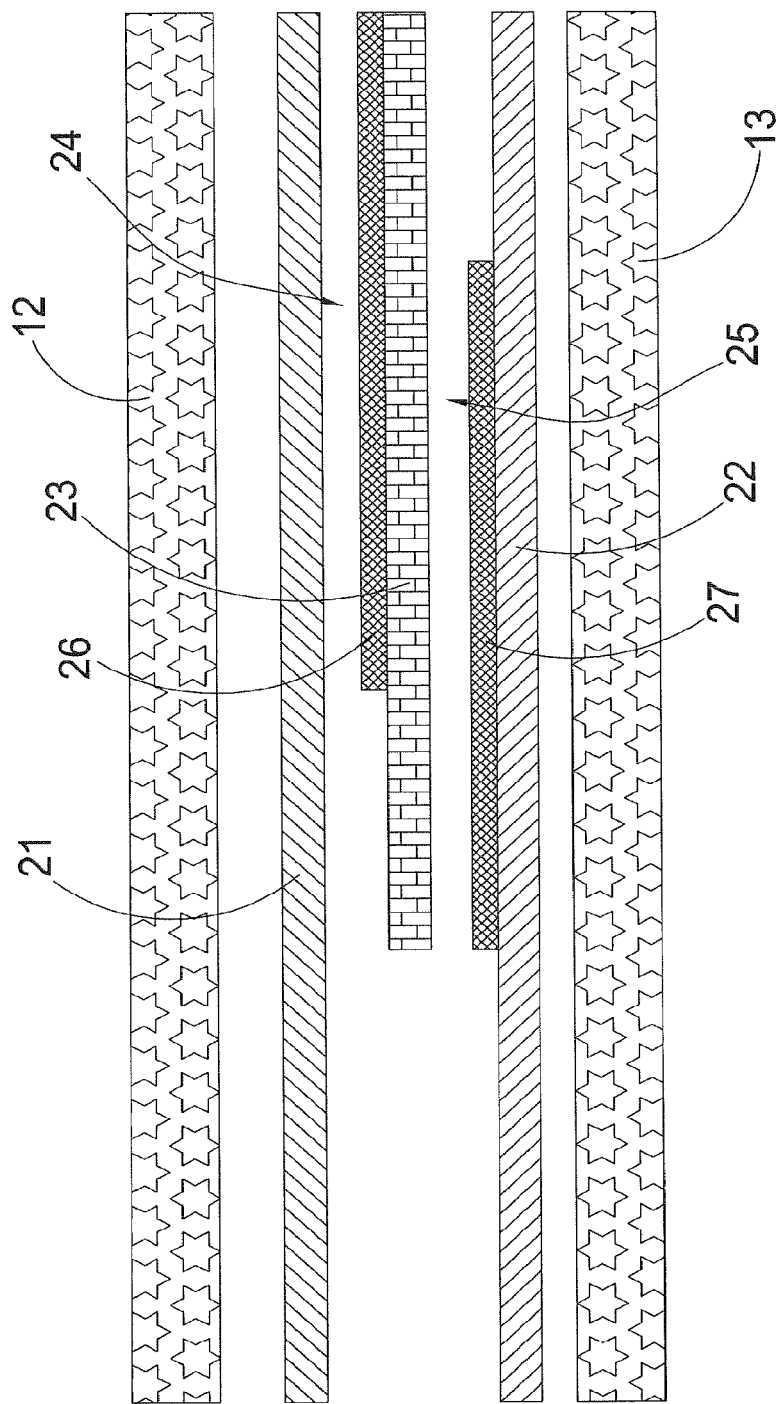
FIG. 5 is an enlarged sectional view of the air valve of the air bag packaging arrangement according to the preferred embodiment of the present invention, illustrating the two heat resisting substances.
Figure 6:
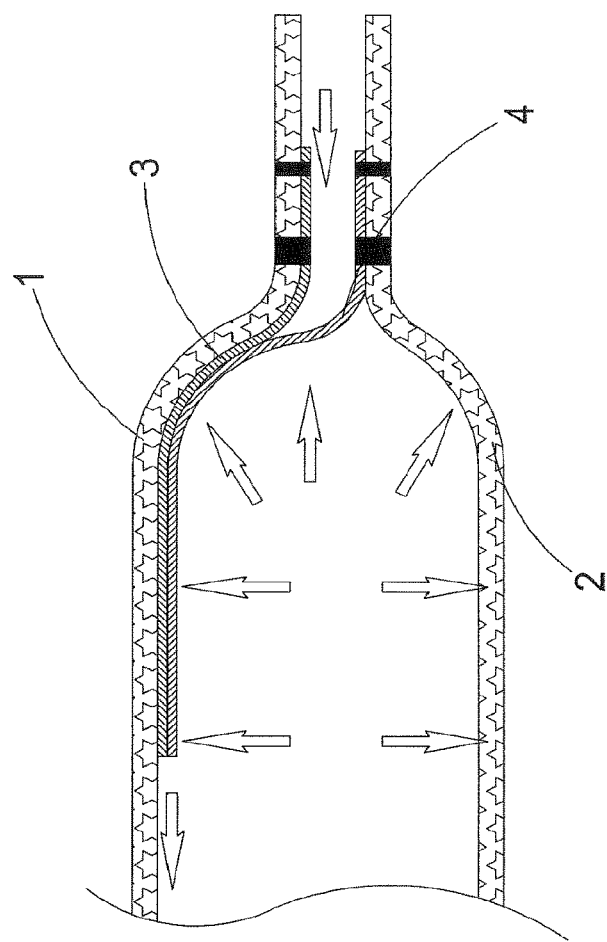
FIG. 6 illustrates an air bag with a conventional air valve.

As shown in FIG. 5, in order to keep an open formation between the first sealing film 21 and the check sealing film 23 after the heat sealing process, the air valve 20 further comprises a first heat resisting substance 26 formed between the first sealing film 21 and the check sealing film 21 for ensuring the air inflating channel 24 between formed therebetween. The first heat resisting substance 26 is provided to prevent the first sealing film 21 and the check sealing film 21 being bonded together after the heat sealing process.

In particular, the first heat resisting substance 26 is provided between the proximal edge portions of the first sealing film 21 and the check sealing film 23 at the valve opening 15 of the air cell 11, so as to ensure the proximal end of the air inflating channel 24 being opened.

Likewise, in order to ensure the open formation between the check sealing film 23 and the second sealing film 22, the air valve 20 further comprises a second heat resisting substance 27 formed between the check sealing film 23 and the second sealing film 22 for ensuring the backflow prevention channel 25 formed therebetween.

In particular, the second heat resisting substance 27 is provided between the distal edge portions of the check sealing film 23 and the second sealing film 22 to ensure the distal end of the backflow prevention channel 25 being opened. It is worth mentioning that the proximal end of the backflow prevention channel 25 is closed by the second sealing seam 202.

According to the preferred embodiment, the first and second heat resisting substances 26, 27 are two heat resisting coatings coated at the respective films at a predetermined location to prevent the films being bonded together during heat sealing process. As shown in FIG. 5, the first heat resisting substance 26 is extended from the proximal end of the check sealing film 23 at one side facing to the first sealing film 21. The second heat resisting substance 27 is extended from the distal end of the check sealing film at an opposed side facing to the second sealing film 22, wherein the second heat resisting substance 27 is not provide at the proximal portion of the check sealing film 23 at the opposed side thereof, such that the proximal end of the backflow prevention channel 25 can be closed by the second sealing seam 202. It is worth mentioning that the second heat resisting substance 27 not only prevents the check sealing film 23 being bonded to the second sealing film 22 to ensure the distal end of the backflow prevention channel 25 being opened but also enhances the check sealing film 23 being coupled to the first sealing film 21 by surface tension to close the air inflating channel 24.

The air valve 20 further comprises two lateral sealing seams 203 as two third sealing seams bonding the first sealing film 21 with the check sealing film 23 to form sidewalls of the air inflating channel 24. The width of the air inflating channel 24 is defined between the two lateral sealing seams 203. In particular, the two lateral sealing seams 203 are two slanted heat sealed seams that the width of the air inflating channel 24 is gradually reducing from the valve opening 15 toward the air chamber 14. In other words, the proximal opened end of the air inflating channel 24 is an enlarged opened end to communicate with the valve opening 15 while the distal opened end of the air inflating channel 24 is a tapered opened end to communicate with the air chamber 14. The tapered air inflating channel 24 will further prevent the air being leaked from the air chamber 14 to the valve opening 15.

Preferably, the lateral sealing seams 203 are extended from the proximal edges of the first and second sealing films 21, 22 toward the distal edges thereof. Therefore, the lateral sealing seams 203 at the proximal portions of the first and second sealing films 21, 22 will bond with the check sealing film 23. The lateral sealing seams 203 at the distal portions of the first and second sealing films 21, 22 will bond the first and second sealing films 21, 22 together.

The air valve 20 further comprises an air blocker 28 provided at the distal portions of the first and second sealing films 21, 22 to block the air in the air chamber 14 being directly flowed back to the air inflating channel 24. Accordingly, the air blocker 28 is aligned with the distal opened end of the air inflating channel 24. The air blocker 28 is formed as a heat sealed seam to heat-bond portions of the first and second sealing films 21, 22, wherein the air blocker 28 has a non-flat blocking surface, such as convex surface or V-shaped surface, aligned with the distal opened end of the air inflating channel 24.

Accordingly, in order to inflate the air cell 11, a probe of the pumping device is inserted into the valve opening 15 to input the compress air into the air inflating channel 24, wherein the air is input at the inflating direction from the proximal opened end of the air inflating channel 24 to the distal opened end thereof, i.e. from the valve opening 15 to the air chamber 14. The air cell 11 will start to be inflated. The air pressure within the air chamber 14 will increase to pop the first and second cell layers 12, 13. At the same time, the air pressure will also exert at the first and second sealing films 21, 22, especially at the distal portions thereof. When the air cell 11 is completely inflated, i.e. the maximum inflation, the air pressure within the air chamber 14 will be strong enough to automatically seal the distal portions of the first and second sealing films 21, 22 and to automatically close the distal opened end of the air inflating channel 24. The probe can be removed from the valve opening 15.

When the distal portions of the first and second sealing films 21, 22 are not totally sealed together, the air within the air chamber 14 may leak to the air inflating channel 24. In order to prevent the air being leaked to the air inflating channel 24, the check sealing film 23 is sealed to the first sealing film 21 to close the distal opened end of the air inflating channel 24. In particular, the inputting direction of the backflow prevention channel 25 is opposite to the inflating direction of the air inflating channel 24. In addition, the opened end of the backflow prevention channel 25 is opened up when the distal opened end of the air inflating channel 24 is closed. Therefore, the air is filled to the backflow prevention channel 25 at the opened end thereof and is remained within the backflow prevention channel 25.

The backflow prevention channel 25 is inflated by the air such that the supplemental air pressure within the backflow prevention channel 25 will be created to seal and close the air inflating channel 24, especially the distal opened end of the air inflating channel 24, between the first sealing film 21 and the check sealing film 23. In particular, the greater the supplemental air pressure within the backflow prevention channel 25 is, the better the sealing effect of the check sealing film 23 forms. In other words, when air within the air chamber 14 is leaked to reduce the air pressure therewithin, the air is filled the backflow prevention channel 25 to increase the air pressure therewithin. Therefore, the total air pressure of the air cell, i.e. the sum of the air pressures within the air chamber 14 and the backflow prevention channel 25, will remain the same. As a result, the air leaked from the air chamber 14 to the backflow prevention channel 25 will further enhance the sealing effect to seal and close the air inflating channel 24.

It is worth mentioning that the air cell 10 can be inflated with air or other inert gas to provide particular functions such as heat resistant or fire protection.

In order to manufacturing the air bag 10, the present invention further provides a manufacturing method which comprises the following steps.

(1) Overlap five sheets with each other, wherein the first and fifth sheets form the first and second cell layers 12, 13, the second and third sheets form the first and second sealing films 21, 22, and the third sheet forms the check sealing film 23. According to the preferred embodiment, the air valve 20 of the present invention can incorporate with any air cell 11 having two cell layers 12, 13. In other words, the step (1) can be rewritten as placing the air valve 20 between the first and second cell layers 12, 13.

(2) Apply the first heat resisting substance 26 between the first sealing film 21 and the check sealing film 21, and apply the second heat resisting substance 27 between the check sealing film 23 and the second sealing film 22.

(3) Bond the proximal edge of the first sealing film 21 with the first cell layer 12 via the first sealing seam 201 by means of heat sealing. Then, bond the second cell layer 13 with the proximal edge of the second sealing film 22 and the proximal edge of the check sealing film 23 via the second sealing seam 202 by means of heat sealing. It is worth mentioning that the air inflating channel 24 is formed between the first sealing film 21 and the check sealing film 23 to communicate the valve opening 15 with the air chamber 14. In addition, the backflow prevention channel 25 is also formed between the check sealing film 23 and the second sealing film 22 that the backflow prevention channel 25 has one opened end and an opposed closed end.

(4) Form the two lateral sealing seams 203 to bond the first sealing film 21 with the check sealing film 23 so as to form sidewalls of the air inflating channel 24.

(5) Form the air blocker 28 provided at the distal portions of the first and second sealing films 21, 22.

Referring to FIG. 7 to FIG. 11 of the drawings, a self-adhesive checking valve 10A, which is adapted to be used in a fluid packaging arrangement, is illustrated. Fluid is filled into the fluid packaging arrangement through the self-adhesive checking valve 10A and is prevented from leakage therethrough. Preferably, the self-adhesive checking valve 10A is fittingly incorporated with an air bag packaging arrangement, wherein air is filled into the air bag packaging arrangement and is prevented from leakage therethrough, so that the cushioning effect of the air bag packaging arrangement is ensured.

Figure 7:
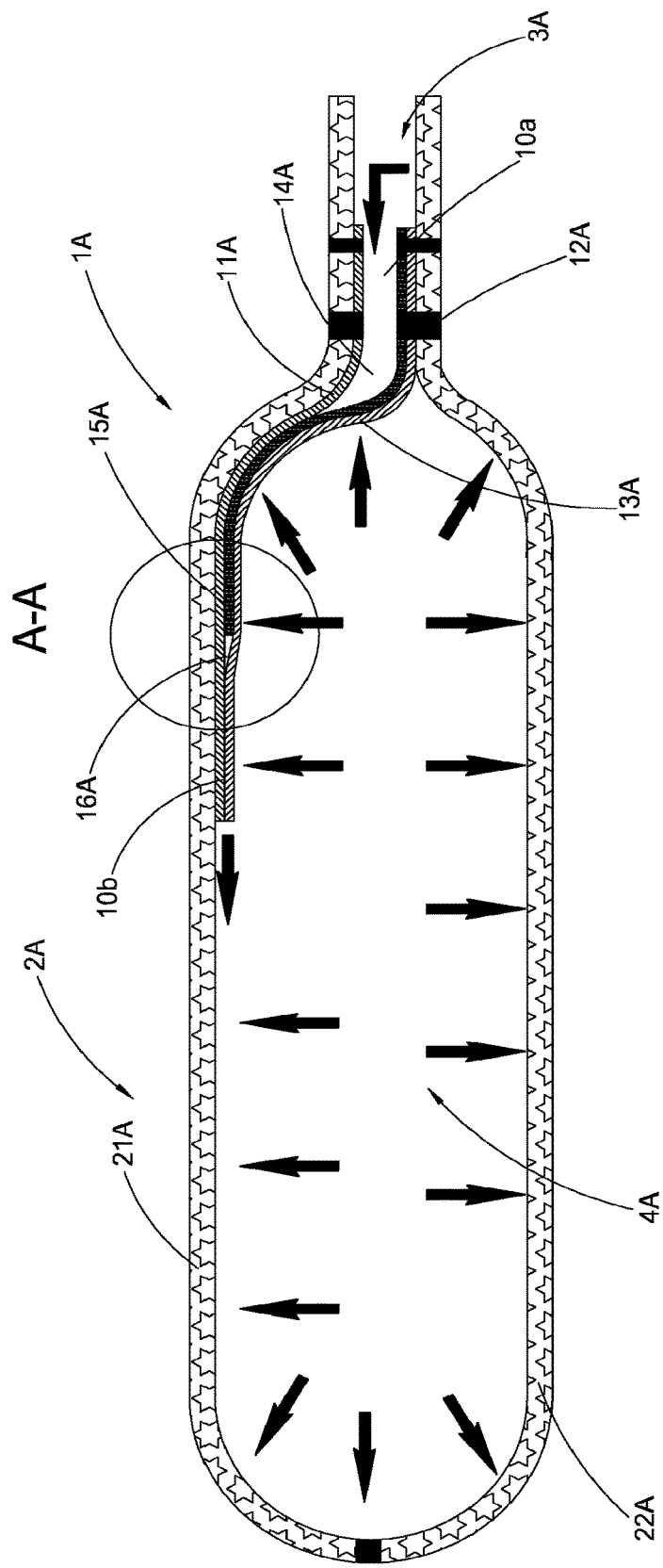
FIG. 7 is a sectional view of a self-adhesive valve according to a second preferred embodiment of the present invention.

According to this preferred embodiment, the air bag packaging arrangement comprises an air cushioning layer 1A comprising a plurality of independent and parallel air cushioning cells 2A and an air channel 3A communicated with the air cushioning cells 2A for inflating air into each of the air cushioning cells 2A. The plurality of air cushioning cells 2A is aligned to provide a receiving chamber 5A for storing an item therein. Referring to FIG. 7 of the drawings, a plurality of self-adhesive valves 10A is used to inflate the air cushioning cells 2A respectively through the air channel 3A which is communicated with the air cushioning cells 2A.

More specifically, the self-adhesive checking valve comprises a first valve film 11A, a second valve film 12A, and a third valve film 13A. The first valve film 11A and the third valve film 13A are positioned at two sides of the second valve film 12A respectively, that is the second valve film 12A is positioned between the first valve film 11A and the third valve film 12A. The first valve film 11A and the second valve film 12A form an air inflating channel 14A therebetween, while the second valve film 11A and the third valve film 12A form a backflow prevention channel 15A therebetween. When air is filled into a receiving cavity 4A through the air inflating channel 14A, the inner surfaces of the first valve film 11A, the second valve film 12A and the third valve film 13A are adhered with each other so that the air in the receiving cavity 4A cannot flow out through the air inflating channel 14A. Even though in case of leakage, the air will flow into the backflow prevention channel 15A that creates a supplemental air pressure to apply on the second valve film 12A to further seal and close the air inflating channel 14A, so that the air is securely prevented from leaking through the air inflating channel 14A. In this preferred embodiment, the receiving cavity 4A is a storing space of each of the air cushioning cells 2A.

Figure 8:
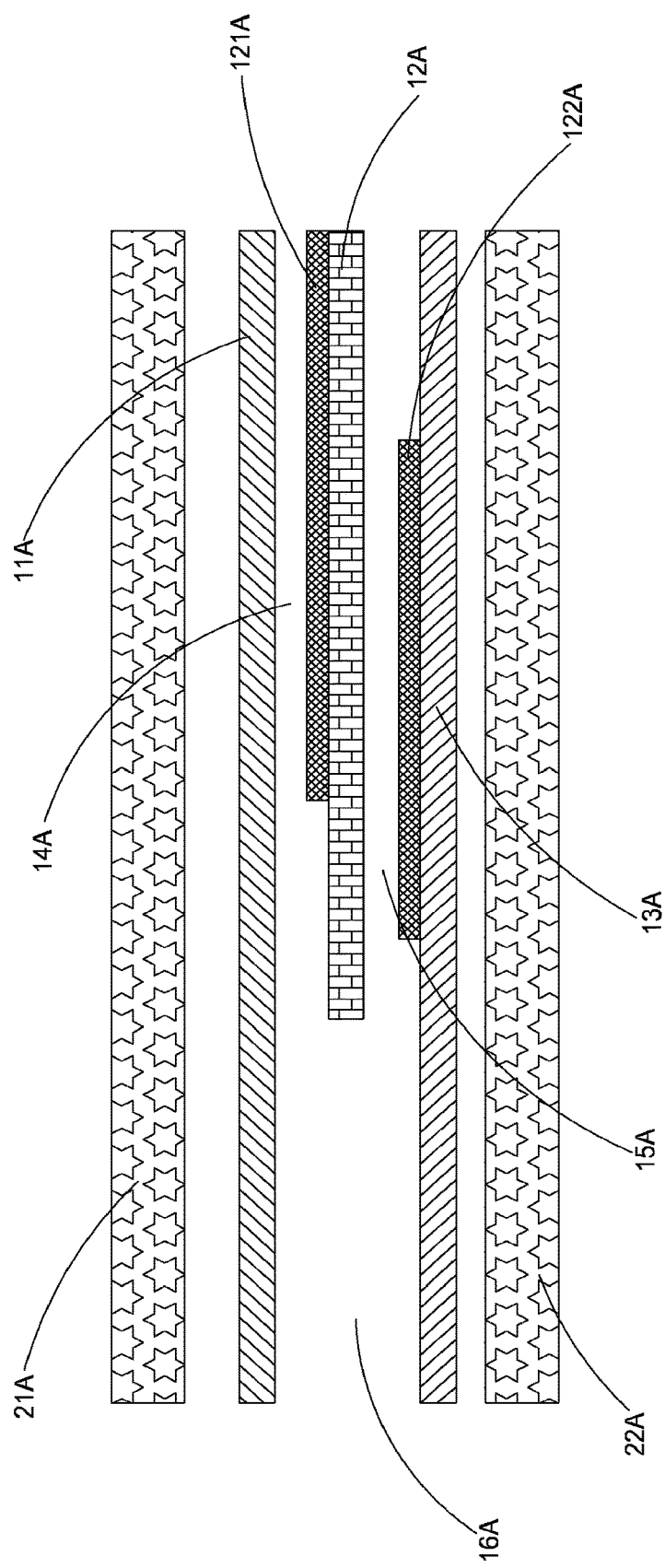
FIG. 8 is an exploded view of the self-adhesive valve according to the above second preferred embodiment of the present invention.
Figure 9:
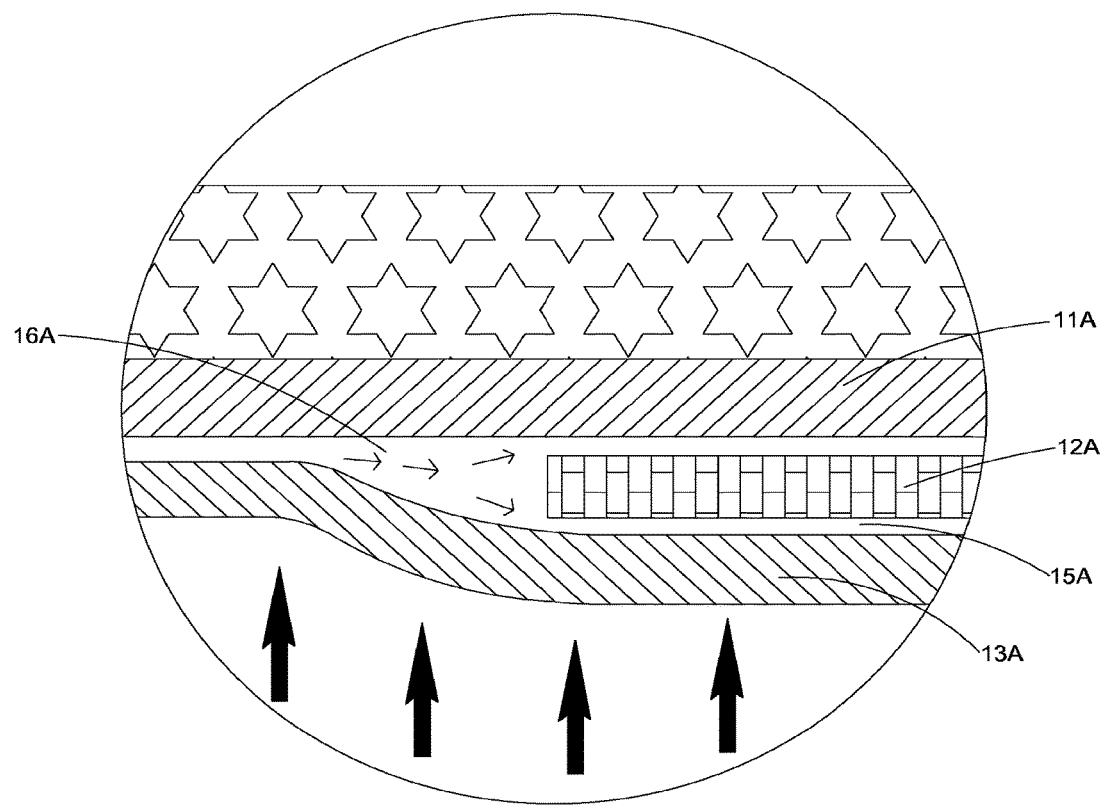
FIG. 9 is an enlarged view of A-A in FIG. 8.

In other words, the air flows from the air channel 3A into the air inflating channel 14A of the self-adhesive checking valve 10A, so that each of the air cushioning cells of the air bag packaging arrangement can be filled with air. When each of the air cushioning cells is filled with air and a desired air pressure is obtained, the air inflating process is stopped. At that time, due to the properties of the three valve films 11A, 12A, 13A, the first valve film 11A, the second valve film 12A and the third valve film 13A are adhered with each other. Referring to FIG. 7 to FIG. 8 of the drawings, the air in each of the air cushioning cells does apply pressure onto the third valve film 13A, so that the third valve film 13A biases against the second valve film 12A and the first valve film 11A in such a manner that the three valve films 11A, 12A, 13A are firmly attached to a wall of each of the air cushioning cells 2A, so that the air cannot easily flow back into the air inflating channel 14A through the three valve films 11A, 12A, 13A.

It is worth mentioning that, the air inflating channel 14A is defined between the first valve film 11A and the second valve film 12A. In other words, at an air inflating side 10 of the self-adhesive checking valve 10A, the first valve film 11A and the second valve film 12A are not completely attached with each other, so that an air passage communicated with the receiving cavity 4A is provided. However, the second valve film 12A and the third valve film 13A at the air inflating side 10 are sealed with each other.

According to the present embodiment, the self-adhesive checking valve has a first side 10a, wherein, the first valve film 11A and the second valve film 12A are not sealed with each other at the first side 10a. At another side of the self-adhesive checking valve 10A, a second side 10b of the self-adhesive checking valve 10A is provided, wherein the second valve film 12A and the third valve film are not sealed with each other, so that a gap is formed therebetween so as to provide and define the backflow prevention channel 15A. When air gets into the backflow prevention channel 15A, because the second valve film 12A and the third valve film are sealed with each other at the corresponding air inflating side 10, the air cannot flow out. When the receiving cavity 4A is filled with air, the air flows back into the backflow prevention channel 15A and creates an air pressure to apply onto the second valve film 12A, so that the second valve film 12A is attached to the first valve film 11A to further seal the air inflating channel 14A, so that the air cannot easily flow out.

The first valve film 11A, the second valve film 12A, and the third valve film 13A are made of flexible material, preferably polyethylene (PE). A first blocking layer 121A is provided between the first valve film 11A and the second valve film 12A, so that when the self-adhesive checking valve undergoes a heat sealing process, the first valve film 11A and the second valve film 12A are not completely sealed with each other so as to form and define the air inflating channel 14A therebetween. A second blocking layer 122A is provided between the second valve film 11A and the third valve film 12A, wherein a length of the second blocking layer 122A is smaller than a length of the second valve film 12A, so that end portions of the second blocking layer 122A are not aligned in an end-to-end manner with the second valve film 12A and the third valve film 13A at the air inflating side 10, so that the second valve film 12A and the third valve film 13A at the inflating side 10 are completely sealed with each other for preventing air leakage. Accordingly, the first blocking layer 121A and the second blocking layer 122A are high temperature durable material, so that during the heat sealing process, the areas with the high temperature durable material are not heat sealed with each other, so that gaps are provided therebetween. In other words, more specifically, referring to FIG. 8 to FIG. 9 of the drawings, a first high temperature durable ink 121A is printed between the first valve film 11A and the second valve film 12A, so that when the self-adhesive checking valve 10A is undergoing the heat sealing process, the first valve film 11A and the second valve film 12A are not completely heat sealed with each other, but forming the air inflating channel 14A instead. A second high temperature durable ink 122A is printed between the second valve film 12A and the third valve film 13A, a length of the second high temperature durable ink 122A is smaller than a length of the second valve film 12A, so that the second high temperature durable ink 122A is not aligned in an end-to-end manner with the second valve film 12A and the third valve film 13A at the air inflating side 10, so that the second valve film 12A and the third valve film 13A of the self-adhesive checking film 10A at the air inflating side 10 are sealed with each other to prevent air leakage.

In other words, when the air receiving cavity 4A is filled with air, in case of air leakage, the air has to select choices between opening the first valve film 11A and the second valve film 12A, or opening the second valve film 12A and the third valve film 13A, so that backflow of the air is not easy. The air flows into the backflow prevention channel 15A between the second valve film 12A and the third valve film 13A will further seal and close the air inflating channel 14A, so that the air cannot flow out though the air inflating channel 14A. Accordingly, the backflow prevention channel 15A is not communicated with the air channel 3A, so that the air is maintained to stay in the backflow prevention channel 15A to further seal and close the air inflating channel 14A.

Preferably, a length of the second valve film 12A is smaller than the lengths of the first valve film 11A and the third valve film. In this preferred embodiment, the first valve film 11A and the third valve film 13A have the same length, wherein the length of the second valve film 12A is smaller than the length of the first valve film 11A and the third valve film 13A. A back flow channel 16A is formed between the first valve film 11A and the third valve film 13A at the second side 10b of the self-adhesive checking valve 10A, so that when the air is about to escape from the receiving cavity 4A, the air has to enter into the backflow channel 16A between the first valve film 11A and the third valve film 13A first, and then the air has to choose whether to enter into the air inflating channel 14A between the first valve film 11A and the second valve film 12A or to enter into the backflow prevention channel 15A between the second valve film 12A and the third valve film 13A. In other words, the air has to climb two stages before getting out, so that possibility and speed of backflow of the air is greatly decreased. Therefore, an increase of numbers of the valve films slows down the backflow speed, and even further, when the air flows into the backflow prevention channel 15A between the second valve film 12A and the third valve film 13A, a supplemental air pressure is created to apply on the second valve film 12A, so that the second valve film 12A is more firmly and securely attached with the first valve film 11A, so that air leakage is effectively prevented.

In other words, before flowing out, the air has to open and enter into the backflow channel 16A between the first valve film 11A and the third valve film 13A, and then chooses to enter into the air inflating channel 14A or the backflow prevention channel 15A, so that the possibility of successfully getting out through the air inflating channel 15A is rare. And, the air getting into the backflow prevention channel 15A will further seal and close the air inflating channel 14A for preventing a subsequent air leakage, so that the air can stay in the receiving cavity 4A for a relatively long period of time. Accordingly, in this preferred embodiment, the air can stay in each of the air cushioning cells 2A for a relatively long time, so that a good cushioning effect can be maintained for a long time too.

In another aspect of the prevent invention, the self-adhesive checking valve 10A comprises two inflating valve films 11A, 13A and a checking film 12A which is provided between the two inflating valve films 11A, 13A. One of the inflating valve films 11A and the checking film 12A form an air inflating channel 14A therebetween, the other inflating film 13A and the checking film 12A form a backflow prevention channel 15A therebetween. When air is inflated into the receiving cavity 4A through the air inflating channel 14A, the inner surfaces of two inflating valve films 11A, 13A and the checking film 12A are adhered with each other, so that the air in the receiving cavity 4A is not easy to flow back into the air inflating channel 14A. And furthermore, in case of leakage, the air flows into the backflow prevention channel 15A and creates a supplemental air pressure to apply on the checking film 12A so as to further seal and close the air inflating channel 14A, so that air leakage is prevented.

When the self-adhesive checking valve 10A is incorporated in an air bag packaging arrangement, each of the air cushioning cells 2A of the air bag packaging arrangement comprises a first sealing film 21A and a second sealing film 22A defining the receiving cavity 4A. The self-adhesive checking valve 10A is provided between the first sealing film 21A and the second sealing film 22A for filling air into the air cushioning cells and also preventing air leakage, so that cushioning effect of the air bag packaging arrangement is enhanced.

More specifically, at the first side 10a of the self-adhesive checking valve 10A, i.e. the air inflating side, the first valve film 11A is heat sealed with the first sealing film 21A, and that the second valve film 12A, the third valve film 13A, and the second sealing film 22A are heat sealed together, so that air from the air channel 3A will flow into the receiving cavity 4A through the air inflating channel 14A between the first valve film 11A and the second valve film 12A. When the inflating process is stopped, inner surfaces of the first valve film 11A, the second valve film 12A and the third valve film 13A are automatically attached with each other. As an example, the first valve film 11A, the second valve film 12A and the third valve film 13A are attached to the first sealing film 21A, so that it is not easy for the air in the receiving cavity 4A to flow back into the air inflating channel 14A. And, the air getting into the backflow prevention channel 15A creates a supplemental air pressure to apply on the second valve film to further seal and close the air inflating channel 14A.

Figure 10:
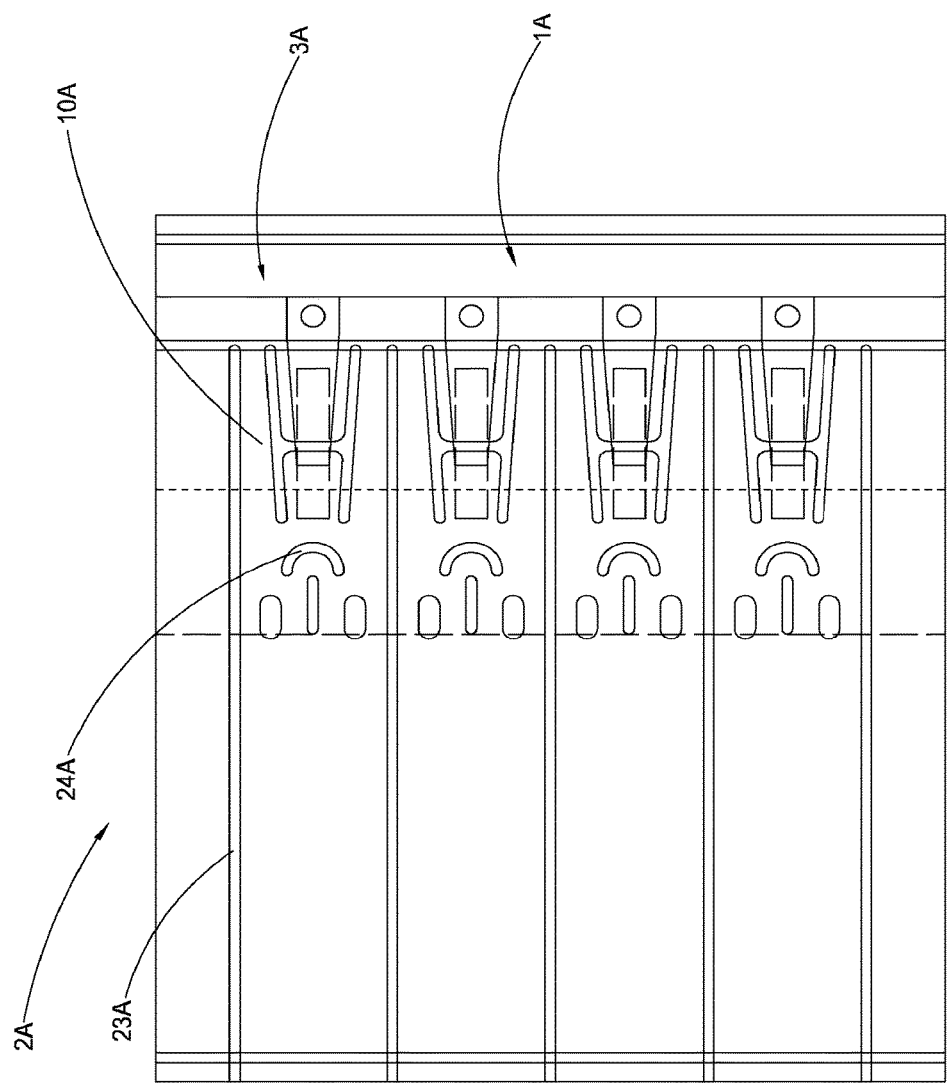
FIG. 10 is a perspective view of the self-adhesive valve according to the above second preferred embodiment of the present invention.
Figure 11:
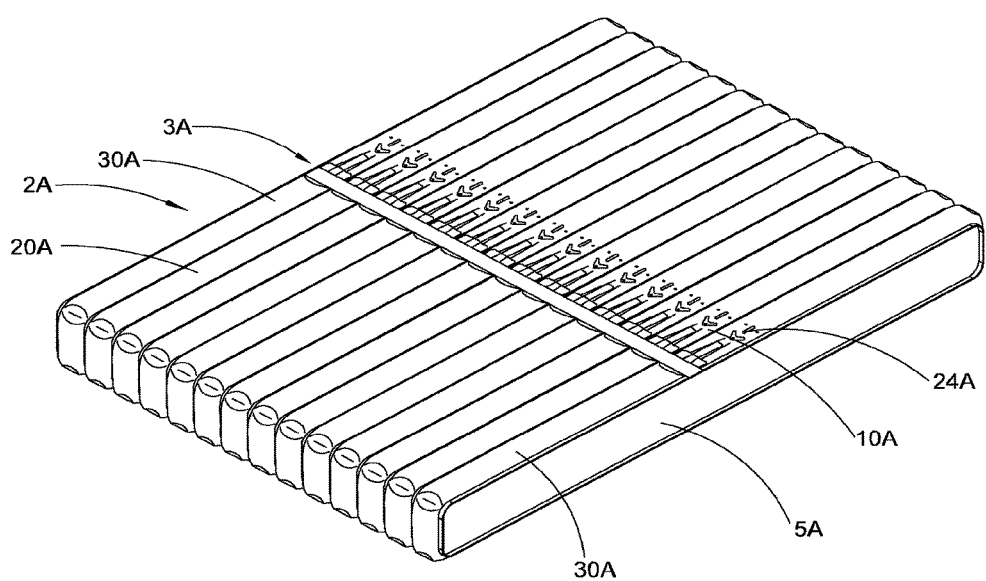
FIG. 11 is perspective view of an air bag packaging arrangement with the self-adhesive valve according to the above second preferred embodiment of the present invention.

Referring to FIG. 10 to FIG. 11 of the drawings, each of the air cushioning cells comprises a bonding line 23A, wherein the first sealing film 21A is overlapped with the second sealing film 22A and bonded together along the bonding line 23A so as to form the parallel air cushioning cells 21A which are communicated with the air channel 3A.

The air cushioning layer 1A has at least two side portions 30A which are connected one by one. Each of the air cushioning cells 2A may further comprise at least two secondary air cushioning cells 20A. Each of the secondary air cushioning cells 20A of the air cushioning cell 2A is communicated with an adjacent secondary cushioning cell 20A. Accordingly, each of the secondary cushioning cells 20A of the air cushioning cell 2A forms a corresponding side portion 30A. In other words, each of the side portions 30A comprises at least a group of parallel secondary air cushioning cells 20A of the air cushioning cells 2A.

The air cushioning layer 1A further comprises a plurality of air blocking members 24A provided in each of the air cushioning cells 2A adjacent to the air inflating channel 14A for preventing air leakage.

Preferably, the air cushioning layer 1A has 3~8 side portions 30A. The number of the secondary air cushioning cells 20A of each of the air cushioning cells 2A is not less than the number of the side portions 30A. The secondary cushioning cells 20A of the an air cushioning cell 2A form the corresponding side portions 30A respectively and are folded along area separating bonding lines to form a hollow structure defining the receiving chamber 5A, In addition, the air bag packaging arrangement may further comprise an outer layer for protecting the air cushioning layer 1A, and a switch can be provided so that when the switch is opened, an item can be put into the receiving chamber 5A of the air cushioning layer 1A.

Accordingly, the self-adhesive checking valve 10A provides a method for filling fluid in a fluid receiving cavity and preventing the fluid to flow out, wherein, preferably, the fluid is air. The method comprises the following steps:

(a) Filling air into a receiving cavity 4A through an air inflating channel 14A provided between a first valve film 11A and a second valve film 12A, wherein when the filling process is stopped, the first valve film 11A and the second valve film 12A are attached with each other because of the air pressure in the receiving cavity 4A, so that the air inflating channel 14A is closed; and (b) Guiding the air in the receiving cavity 4A into a backflow prevention channel 15A provided between the second valve film 12A and a third valve film 13A so as to further seal and close the air inflating channel 14A, so that air in the receiving cavity 4A is not easy to flow out of the receiving cavity 4A.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of producing an air bag packaging arrangement, comprising the steps of:
    (a) providing an air cushioning layer comprising a group of independent and parallel air cushioning cells;
    (b) providing an air channel communicated with each of said air cushioning cells for inflating air therein;
    (c) folding said air cushioning cells to provide a receiving chamber for storing items;
    (d) providing a group of self-adhesive checking films each comprising a first valve film, a second valve film, and a third valve film positioned between said first valve film and said second valve film;
    (e) forming an air inflating channel between said first valve film and said second valve film;
    (f) forming a backflow prevention channel between said second valve film and said third valve film in such a manner that when said air receiving cavity is filled with said air through said air inflating channel, inner surfaces of said first valve film said second valve film, and said third valve film are attached with each other to prevent said air to flow back through said air inflating channel, wherein in case of leakage, said air is selectively guided into said backflow prevention channel to create a supplemental air pressure to apply on said second valve film to further seal and close said air inflating channel so as to prevent air leakage;
    (g) providing a first blocking layer between said first valve film and said second valve film, so that when said self-adhesive checking valve undergoes a heat sealing process, said first valve film and said second valve film are not completely sealed with each other in such a manner that said air inflating channel is formed therebetween, and
    (h) providing a second blocking layer between said second valve film and said third valve film, wherein a length of said second blocking layer is smaller than a length of said second valve film, so that end portions of said second blocking layer are not aligned in an end-to-end manner with said second valve film and said third valve film at an inflating side, wherein said second valve film and said third valve film at said inflating side are completely sealed with each other.

2. The method, as recited in claim 1, wherein said length of said second valve film is smaller than a length of said first valve film and a length of said third valve film.

3. The method, as recited in claim 1, further comprising the step of:
    forming a back flow channel between said first valve film and said third valve film at another side opposite to said inflating side of said self-adhesive checking valve in such a manner that when said air is to escape from said receiving cavity, said air has to enter into said backflow channel between said first valve film and said third valve film first, and then said air has to choose whether to enter into said air inflating channel between said first valve film and said second valve film or to enter into said backflow prevention channel between said second valve film and said third valve film, wherein when said air is maintained in said backflow prevention channel, said air pressure is applied on said second valve film to further seal and close said air inflating channel.

4. The method, as recited in claim 2, wherein said first valve film and said third valve film have the same length and said method further comprises a step of forming a back flow channel between said first valve film and said third valve film at another side opposite to said inflating side of said self-adhesive checking valve in such a manner that when said air is to escape from said receiving cavity, said air has to enter into said backflow channel between said first valve film and said third valve film first, and then said air has to choose whether to enter into said air inflating channel between said first valve film and said second valve film or to enter into said backflow prevention channel between said second valve film and said third valve film, wherein when said air is maintained in said backflow prevention channel, said air pressure is applied on said second valve film to further seal and close said air inflating channel.

5. The method, as recited in claim 3, wherein each of said air cushioning cells comprises a first sealing film and a second sealing film, wherein each of said self-adhesive checking valve is provided between said first sealing film and said second sealing film, wherein each of said air cushioning cells comprises a bonding line, wherein said first sealing film is overlapped with said second sealing film and bonded together along said bonding line so as to form said parallel air cushioning cells which are communicated with said air channel.

6. The method, as recited in claim 4, wherein each of said air cushioning cells comprises a first sealing film and a second sealing film, wherein each of said self-adhesive checking valve is provided between said first sealing film and said second sealing film, wherein each of said air cushioning cells comprises a bonding line, wherein said first sealing film is overlapped with said second sealing film and bonded together along said bonding line so as to form said parallel air cushioning cells which are communicated with said air channel.

7. The method, as recited in claim 3, further comprising a step of heat sealing said first valve film with said first sealing film at an inflating side of said self-adhesive checking valve, so as to heat sealing said second valve film, said third valve film, and said second sealing film together.

8. The method, as recited in claim 4, further comprising a step of heat sealing said first valve film with said first sealing film at an inflating side of said self-adhesive checking valve, so as to heat sealing said second valve film, said third valve film, and said second sealing film together.

9. The method, as recited in claim 5, further comprising a step of heat sealing said first valve film with said first sealing film at an inflating side of said self-adhesive checking valve, so as to heat sealing said second valve film, said third valve film, and said second sealing film together.

10. The method, as recited in claim 6, further comprising a step of heat sealing said first valve film with said first sealing film at an inflating side of said self-adhesive checking valve, so as to heat sealing said second valve film, said third valve film, and said second sealing film together.

* * * * *